United States Patent
Withers

(10) Patent No.: US 8,911,877 B2
(45) Date of Patent: Dec. 16, 2014

(54) EMBOSSED METAL FOIL

(75) Inventor: Philip Craig Withers, Victoria (AU)

(73) Assignee: Intellectual Property Development Corporation Pty Ltd, Melbourne (AU)

( * ) Notice: Subject to any disclaimer, the term of this patent is extended or adjusted under 35 U.S.C. 154(b) by 1016 days.

(21) Appl. No.: 12/438,520

(22) PCT Filed: Aug. 24, 2007

(86) PCT No.: PCT/AU2007/001217
§ 371 (c)(1),
(2), (4) Date: Oct. 28, 2009

(87) PCT Pub. No.: WO2008/022397
PCT Pub. Date: Feb. 28, 2008

(65) Prior Publication Data
US 2010/0108689 A1 May 6, 2010

(30) Foreign Application Priority Data
Aug. 25, 2006 (AU) ................. 2006904774

(51) Int. Cl.
*A47J 36/00* (2006.01)
*A47J 36/02* (2006.01)

(52) U.S. Cl.
CPC ...................................... *A47J 36/02* (2013.01)
USPC ............. 428/603; 428/604; 428/606; 99/444; 99/445

(58) Field of Classification Search
None
See application file for complete search history.

(56) References Cited

U.S. PATENT DOCUMENTS

| | | | | |
|---|---|---|---|---|
| 1,006,601 A | * | 10/1911 | Speller | 72/187 |
| 1,074,824 A | * | 10/1913 | Wadsworth | 72/188 |
| 1,154,254 A | * | 9/1915 | Lachman | 29/897.32 |
| 1,937,980 A | * | 12/1933 | Ritter | 52/314 |
| 2,075,286 A | * | 3/1937 | Jackes | 428/604 |
| 2,152,297 A | * | 3/1939 | Wilson | 428/604 |
| 2,230,555 A | * | 2/1941 | Wright | 52/536 |
| 2,233,592 A | * | 3/1941 | Dunajeff | 428/604 |
| 2,699,599 A | * | 1/1955 | Potchen | 428/604 |
| 3,122,459 A | * | 2/1964 | Hollis et al. | 148/287 |
| 3,133,795 A | * | 5/1964 | Voegeli | 428/604 |
| 3,144,974 A | * | 8/1964 | Eichner et al. | 220/608 |
| 3,190,412 A | * | 6/1965 | Rutter et al. | 428/593 |
| 3,254,968 A | * | 6/1966 | Bender | 428/596 |
| 3,485,596 A | * | 12/1969 | Alleaume | 428/604 |
| 4,044,186 A | * | 8/1977 | Stangeland | 428/167 |
| 4,394,410 A | | 7/1983 | Osrow et al. | |
| 4,740,334 A | * | 4/1988 | Rukovena, Jr. | 261/112.2 |
| 5,314,738 A | * | 5/1994 | Ichikawa | 428/182 |
| 5,447,097 A | | 9/1995 | Rhee | |
| 5,501,912 A | * | 3/1996 | Sergenius | 428/604 |
| 5,521,018 A | | 5/1996 | Wilkinson et al. | |
| 6,176,819 B1 | | 1/2001 | Boegli et al. | |
| 6,280,856 B1 | * | 8/2001 | Andersen et al. | 428/593 |

(Continued)

FOREIGN PATENT DOCUMENTS

GB    1436772    5/1976

*Primary Examiner* — John J Zimmerman
(74) *Attorney, Agent, or Firm* — K&L Gates LLP

(57) ABSTRACT

A metal sheet at least part of which is embossed with an embossing pattern that includes undulations which are mutually arranged closely adjacent to each other so that in use egress of fluid from the plane of the sheet is omnidirectionally controlled.

8 Claims, 4 Drawing Sheets

(56) References Cited

U.S. PATENT DOCUMENTS

| | | | |
|---|---|---|---|
| D454,255 S * | 3/2002 | Walther et al. ................... D5/55 | |
| 6,919,547 B2 | 7/2005 | Tsontzidis et al. | |
| 7,340,994 B2 * | 3/2008 | Bruno et al. .................... 99/450 |
| D584,062 S * | 1/2009 | Bracey .............................. D5/56 |
| D636,607 S * | 4/2011 | Withers ........................... D5/56 |
| 2004/0142201 A1 * | 7/2004 | Fukunaga et al. ............ 428/596 |
| 2004/0195749 A1 | 10/2004 | Bryant et al. |
| 2005/0000368 A1 * | 1/2005 | Siegel et al. .................... 99/400 |

\* cited by examiner

EMBOSSED METAL FOIL

BACKGROUND

1. Technical Field

The present disclosure relates to embossed metal foil.

2. Description of the Related Art

Household metal foils generally consist of smooth, shiny, thin sheet material. Problems with conventional thin, smooth foils include pooling or runoff of cooking fluids, sticking to cooked food, smudging or marking of the smooth shiny surface, and poor strength, rigidity, stretchability, foldability, and tearability.

Previously proposed methods of enhancing the performance and usability of smooth metal foils have been expensive or unsatisfactory. For example, plastic laminates have been added to smooth metal foils to reduce sticking and add strength. To improve their appearance, metal foils have also been embossed or microembossed with decorative patterns of open, unconnected straight lines or closed rectilinear shapes such as diamonds.

A need therefore exists for a more cost-effective and satisfactory method of enhancing the performance, appearance, and properties of domestic metal foils.

BRIEF SUMMARY

According to the present disclosure, there is provided a metal sheet at least part of which is embossed with an embossing pattern that includes undulations mutually arranged closely adjacent to each other so that in use egress of fluid from the plane of the sheet is omnidirectionally controlled.

The undulations can be mutually arranged to define interconnected tortuous fluid egress channels.

The undulations can have a S-shaped plan shape.

The undulations can have a curved plan shape selected from alternating circular arc segments, sinusoidal segments, rounded zigzags, wave-shapes, serpentine-shapes, C-shapes, U-shapes, and combinations thereof.

The undulations can overlap or nest with each other. The undulations can be mutually parallel in transverse, longitudinal or diagonal directions.

The undulations can taper in respect of their width or height towards their ends. The undulations can have differing heights.

The undulations can be provided on one or both sides of the sheet. The undulations can have a vertical cross section shape selected from an inverted V-shape, an inverted U-shape, an inverted squared U-shape, and combinations thereof.

At least part of the sheet can be microembossed with a microembossing pattern. The microembossing pattern can include pyramidal ribs or knurling. At least part of the sheet can be textured with a visual texturing. The visual texturing can include sandblasted texturing. At least part of the sheet can be printed with printing.

The microembossing pattern, visual texturing, and printing can be selectively and individually provided on or between the undulations. The embossing pattern, microembossing pattern, visual texturing, and printing can be selectively superposed on each other.

The embossing pattern can have a height of between 0.01 mm to 25 mm. The microembossing pattern can have a height of between 0.001 mm and 0.1 mm. The metal sheet can be made of aluminium or aluminium alloy. The metal sheet can have a thickness of between 0.005 mm and 3 mm.

The present disclosure also provides an article formed from or including the embossed metal sheet.

The article can be selected from a foil sheet, a foil roll, a foil roll dispenser, a receptacle, a tray, a container, a lid, cookware, bakeware, a food package, and combinations thereof.

The article can be bakeware and the embossing pattern can be provided on at least part of an upper surface of the bakeware so that in use food to be baked is releasably received on the embossing pattern.

The bakeware can be a cookie sheet or a biscuit sheet.

BRIEF DESCRIPTION OF THE SEVERAL VIEWS OF THE DRAWINGS

The embodiments of the disclosure will be further described by way of example only with reference to the accompanying drawings, in which.

DETAILED DESCRIPTION

Figure 1:
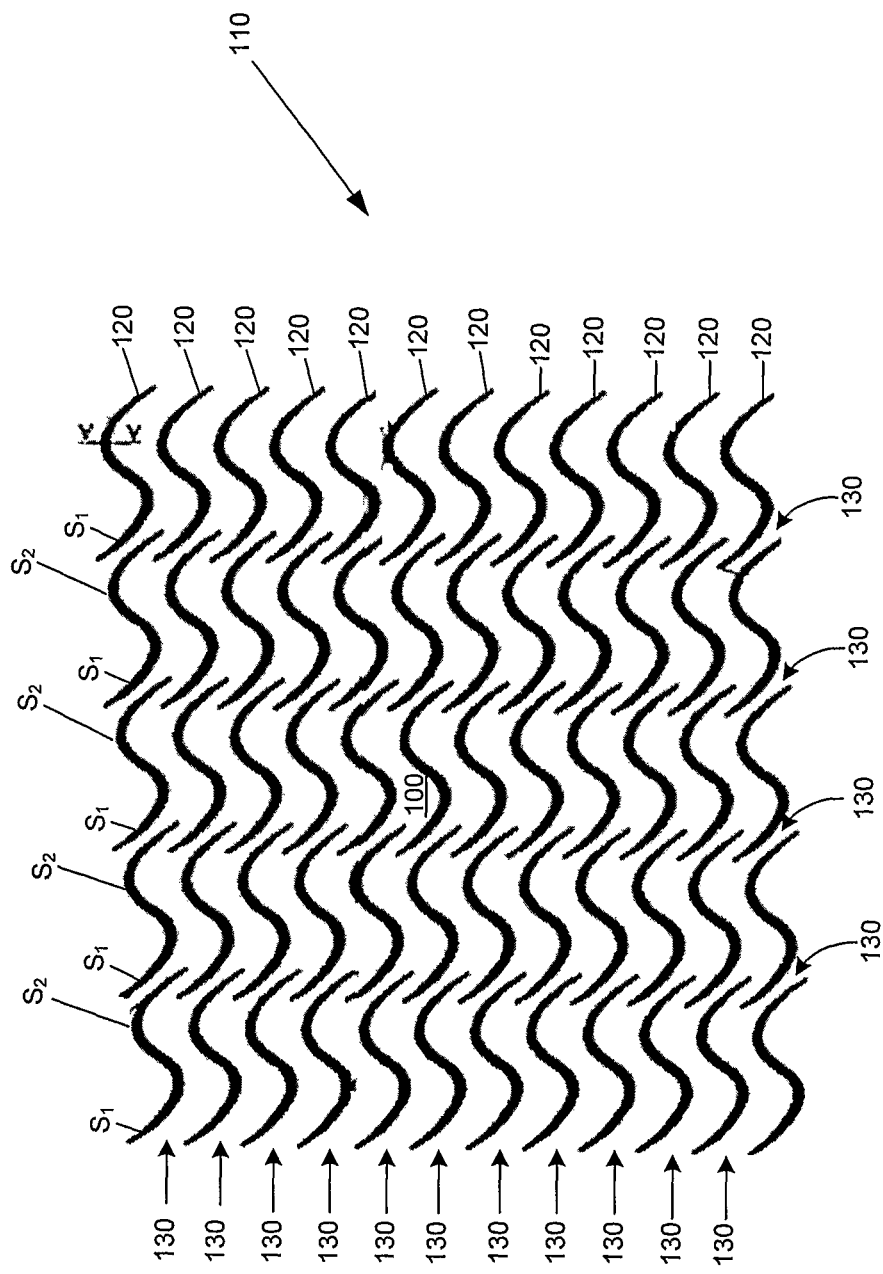
FIGS. 1 to 4 are plan views of metal foils of embodiments of the disclosure with different embossing patterns.
Figure 2:
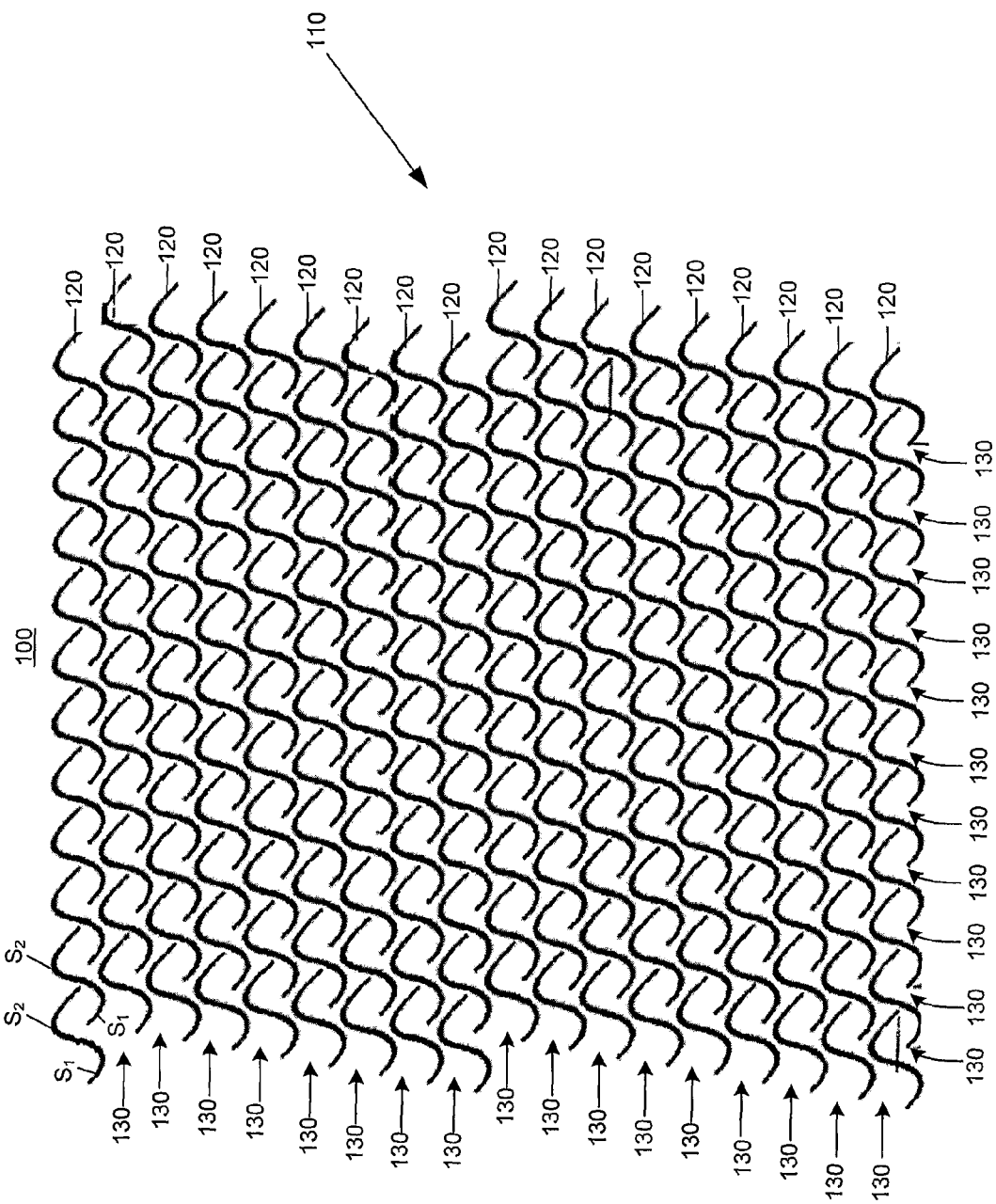

FIGS. 1 to 4 illustrate sheets of aluminium or aluminium alloy household kitchen or cooking foil 100 embossed with embossing patterns 110. The embossing patterns 110 generally include undulations, corrugations or ribs 120 that are mutually arranged closely adjacent to each other so as to define interconnected tortuous fluid egress channels 130. The mutual arrangement of the undulations 120 and the fluid egress channels 130 provides controlled fluid egress in the plane of the foil 100 in all directions. The illustrated embossing patterns 110 are uniform but other equivalent non-uniform embossing patterns may also be used over all or part of the area of the foil 100.

The embossing patterns 110 can use any conventional geometry, for example, Euclidean geometry or fractal geometry. In the illustrated embodiments, the non-limiting examples of embossing patterns 110 include S-shaped undulations 120 having plan shapes consisting of alternating circular arc segments $S_1$, $S_2$ that taper in respect of their width towards their ends. The undulations 120 can have other equivalent regular or irregular curved or rectilinear plan shapes. For example, the undulations 120 can have curved plan shapes such as sinusoidal segments, rounded zigzags, wave-shapes, serpentine-shapes, C-shapes, U-shapes, etc. Equivalent rectilinear plan shapes can include, for example, alternate T- and inverted-T shapes, and staggered, overlapping or nesting X-shapes, H-shapes, F-shapes, etc.

In the illustrated embossing patterns 110, the S-shaped undulations 120 overlap or nest with each other, and are mutually parallel in transverse, longitudinal or diagonal directions across the foil 100. Other equivalent non-parallel arrangements may also be used. The undulations 120 can have differing heights, and can also taper in respect of their height towards their ends.

The undulations 120 can be provided on one or both sides of the foil 100, and can have a vertical cross section shape selected from an inverted V-shape, an inverted U-shape, an inverted squared U-shape, etc.

Figure 3:
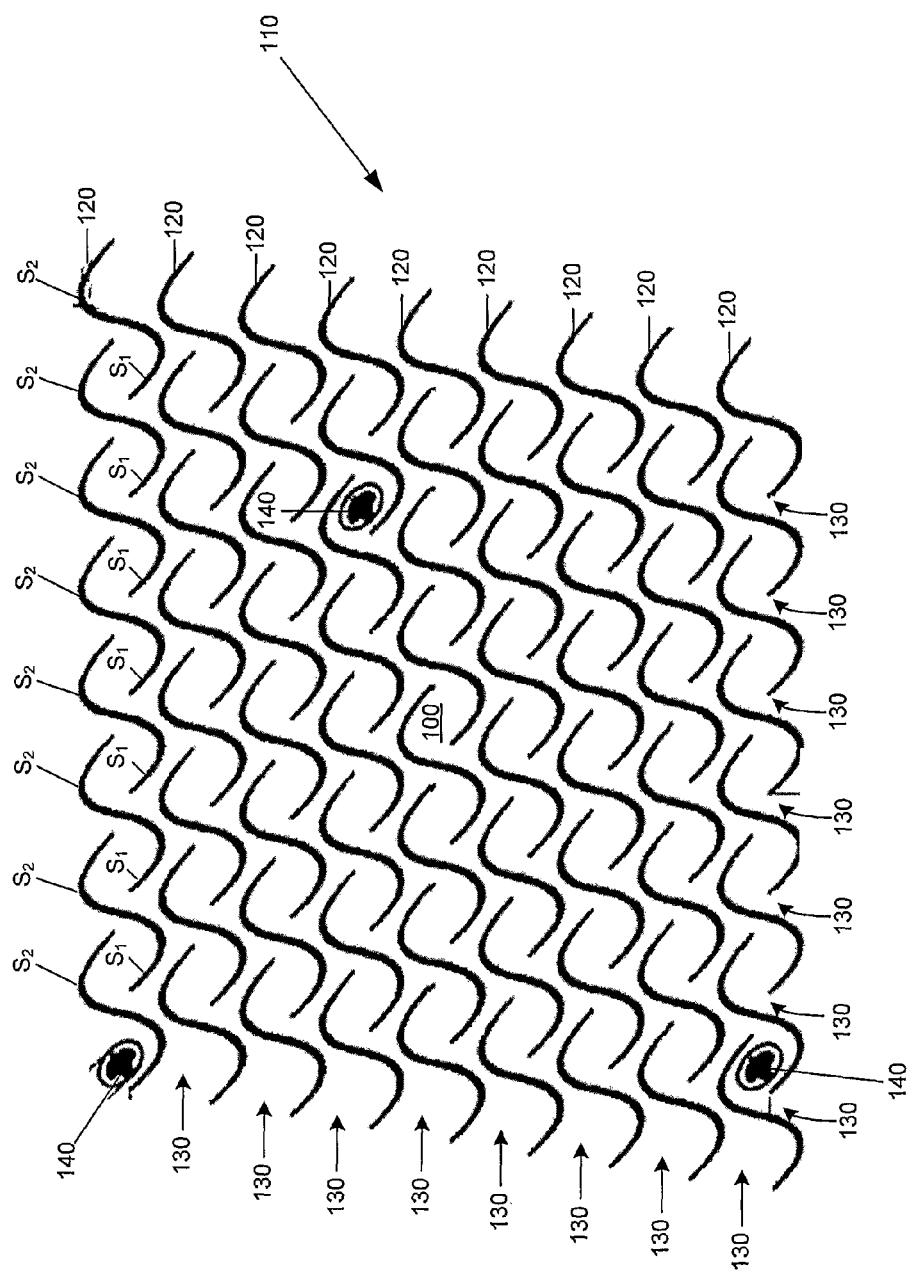
Figure 4:
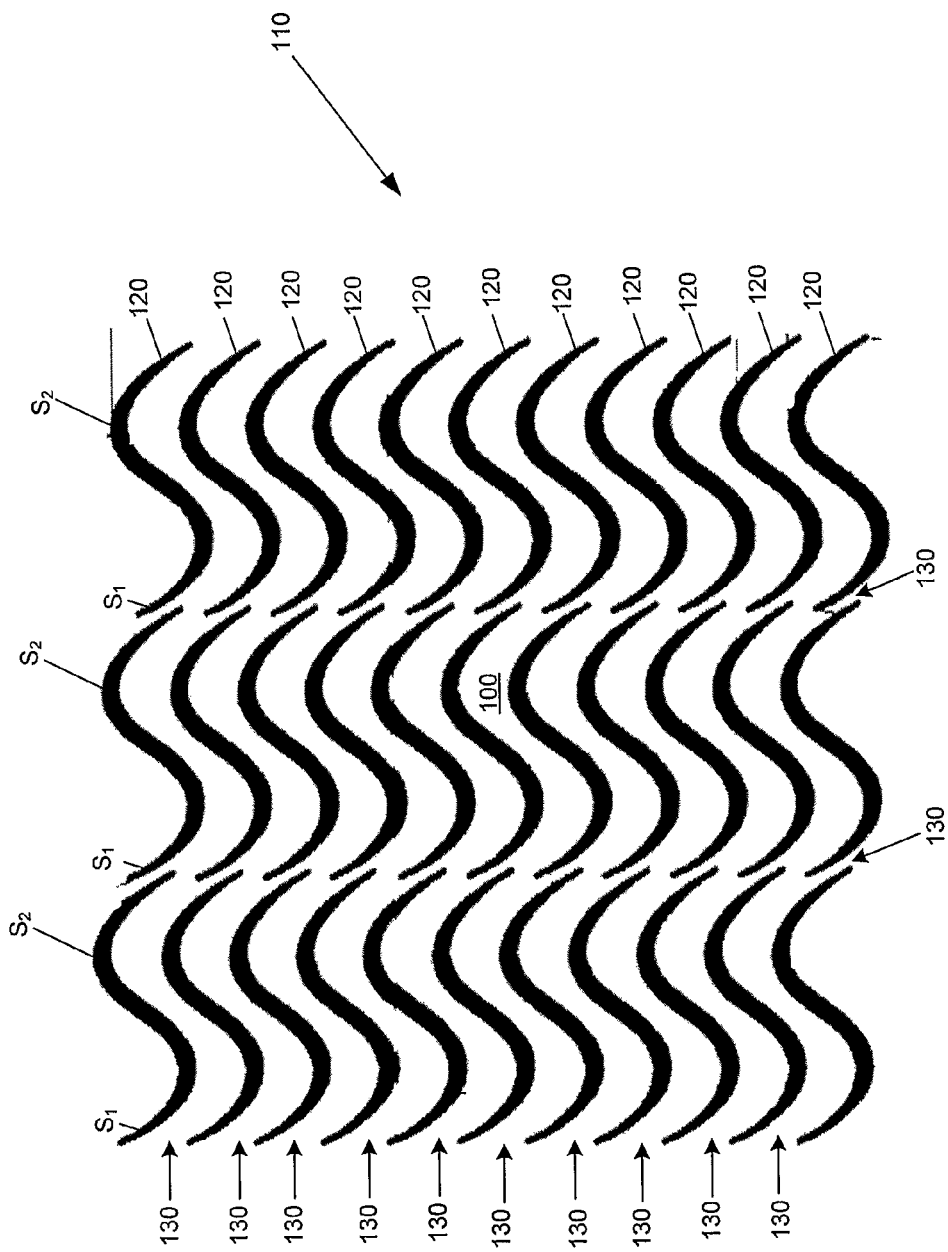

Although not illustrated, the foil 100 is also microembossed with a microembossing pattern. The microembossing pattern can include pyramidal ribs, knurling, scoring, sandblasting, etc. In addition, FIG. 3 illustrates that the foil 100 can further include printing 140, for example, brand indicia, logos, text, graphics, etc. Although not illustrated, the foil 100 is also textured with a visual texturing, for example, sandblasted texturing. The microembossing pattern, visual texturing, and printing can be selectively and individually provided on or between the undulations 120. The embossing pattern, microembossing pattern, visual texturing, and printing can be superposed on each other to provide foil 100 having a pleasing, attractive and marketable appearance that clearly differentiates embossed foil products of the disclosure from conventional household foil products.

The embossing pattern 110 can have a height of between 0.01 mm to 25 mm. The microembossing pattern can have a height of 0.001 mm and 0.1 mm. The foil 100 can have a thickness of between 0.005 mm and 3 mm, for example, 0.013 mm.

The embossing pattern 110 can be formed using conventional embossing methods, for example, roll embossing or stamp embossing. The microembossing pattern or the visual texturing can be formed using conventional techniques, for example, knurling, scoring, micromachining, photolithography, etching, sandblasting, printing etc.

The embossed metal foils 100 can be conventionally fabricated or packaged into various household or kitchen articles such as foil sheets, foil rolls, foil roll dispensers, receptacles, trays, containers, lids, cookware, bakeware, food packages, etc. For example, embossed metal foils of this disclosure can be pressed into trays using moulds. The embossed foils can also be formed into bakeware or cookware with the embossing pattern provided on at least part or all of the bakeware or cookware so that in use food to be baked is releasably received on the embossing pattern. For cookware or bakeware, such as cooking, grilling or baking trays, the embossing patterns can be provided over the entire horizontal surface area of the articles. Alternatively, where the bakeware is a cookie sheet or a biscuit sheet, the embossing patterns can be provided on the sheet in a plurality of spaced apart circular areas for releasably receiving a corresponding plurality of pieces of cookie or biscuit dough to be baked.

The embossed metal foils of this disclosure have superior performance, appearance and usability relative to conventional smooth metal foils. For example, the cooking performance of the embossed foils is improved by reason of the arrangement of undulations and fluid egress channels which ominidirectionally control egress, spreading or dispersion of fluids (i.e., liquids and gases) in the plane of the foil. This avoids uncontrolled runoff of oil and cooking fluids and ensures that sufficient amounts of fluid are kept close to the food during cooking to impart flavor, moistness and tenderness. The embossing pattern also prevents pooling of cooking fluids and oil by controllably allowing cooking fluid to egress, spread and disperse away from the food during cooking. When a food item is completely contained within foil and the oils splatter, the S-shaped undulations disperse cooking liquids through the fluid egress channels, while also maintaining an oily coating on the inner surface of the embossed foil that aids in even heat dispersion and more even cooking of the food item. Foils or trays with embossing provide liquid channeling and dispersion, and hot air flow underneath the cooked article which further aids even cooking. The superior cooking characteristics of metal foils of this disclosure are therefore provided by the combination of the undulations upon which the food rests and the fluid egress channels that provide airways or liquid channels under the food. The flavor, taste and healthiness of the food cooked on or in embossed foil of this disclosure are consequentially enhanced relative to food cooked on or in smooth foil.

The cooking characteristics of embossed foils of the disclosure are also improved by reason of the increased area of food which is exposed for heat absorption. This is because the embossing patterns reduce the planar contact area for food compared to smooth foils. As mentioned above, the fluid egress channels act as airways for controlled flow of hot air under more exposed areas of food during cooking.

The reduced contact area of the embossed foils also advantageously reduces adhesion or sticking of food. This is because cooked food can be more easily removed from the tops of the undulations compared to the complete contact and adherence in the case of smooth foils. Food products that are cooked or baked on the embossed foils release more easily because only a small fraction of the food actually comes into contact with the cooking surface. Similarly, the reduced planar contact area provided by the undulations means that the embossed foils can be more easily removed or released from cooking surfaces when cooking is completed.

The controlled egress, spreading or dispersion of cooking fluids in the plane of the foil provided by the embossing pattern also reduces runoff, leakage and spillage of cooking fluids and oil from the edges of the foil. Thus, embossed foil of this disclosure has improved hygiene and handling characteristics compared to smooth foil.

The embossing patterns also increase the perceived or apparent thickness of foils of the disclosure. The perceived thickness is the perpendicular distance from the top of the undulations on one side of the embossed foil to the highest point on the opposite side of the foil. In addition to the increased perceived thickness, the embossing pattern provides a pleasing tactile sensation when handled. Further, the embossing pattern makes foil of this disclosure easier to grip and handle compared to smooth foils.

The undulations of the embossing pattern have a pleasing appearance and also prevent smudging, marking, fingerprints and surface imperfections from standing out as is the case with smooth foils.

The cooking performance, pleasing tactile feel and attractive appearance of embossed foils of this disclosure can be further enhanced by the superposed microembossing patterns and visual texturing. For example, microembossing patterns on the undulations, or in the fluid egress channels, can further enhance the omnidirectionally controlled egress, spreading and dispersion of cooking fluids in the plane of the embossed foils. Microembossed knurling adds to the pleasing tactile feel of the embossed foils, and sandblasting visual texturing adds to their attractive appearance.

In addition to enhancing cooking performance and "look and feel" qualities, the embossing patterns of this disclosure improve the mechanical and material properties of metal foils. For example, the embossing patterns provide increased rigidity and dimensional stability to metal foils. This means that thinner gauge embossed foils can have substantially the same rigidity and dimensional stability as thicker gauge smooth foils. The stretchability, conformability and "deadfold" ability of embossed foils are also improved compared to smooth foils. The undulations are pre-stretched during embossing and this confers improved stretchability and sponginess on the embossed foils. The embossed foils are more easily stretched and wrapped around food without shrinkage, springiness, wrinkling, crushing and rupture. This is because the stretchable undulations take up and distribute stresses at stretch points around the corners and edges of food. This means that the embossed foils stay wrapped around food items without springing back after stretching and wrapping, and without needing further sealing using ties or tape.

In addition, the undulations and fluid egress channels of the embossing pattern enhance the omnidirectional tearability of the embossed foils because they act as pre-formed lines of weakness or rupture after an initial tear has been made.

It will be appreciated that the embossing patterns of embodiments of this disclosure provide cost-effective means of enhancing the performance, properties, appearance and marketability of household or domestic metal foils.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such

The invention claimed is:

1. Embossed metal foil having a regular repeating embossing pattern of a plurality of discrete S-shaped ribs spaced apart from and parallel to one another, wherein areas around the ribs form a plurality of channels that intersect one another to form tortuous paths for fluids.

2. Embossed metal foil according to claim 1, wherein the embossed metal foil is aluminum cooking foil.

3. A cooking container comprising embossed metal foil according to claim 1.

4. A cooking tray comprising embossed metal foil according to claim 1.

5. Embossed metal foil according to claim 1, wherein the embossed metal foil is composed of aluminum or an aluminum alloy.

6. Embossed metal foil according to claim 1, wherein the S-shaped ribs have plan shapes consisting of alternating circular arc segments, each circular arc segment having a width that tapers towards an end of the segment.

7. Embossed metal foil according to claim 1, further comprising at least one selected from the group consisting of: a microembossing pattern, printing and visual texturing.

8. Embossed metal foil according to claim 1, wherein the regular repeating embossing pattern has a height of 0.01 mm to 25 mm.

* * * * *